(12) United States Patent
Yamada et al.

(10) Patent No.: US 6,497,113 B1
(45) Date of Patent: Dec. 24, 2002

(54) REFRIGERATOR

(75) Inventors: Hiroshi Yamada, Koka-gun (JP); Hiroki Hamano, Izumiotsu (JP); Akira Hyoudou, Ikoma (JP); Yoshito Kimura, Hirakata (JP); Haruhiko Iwai, Yasu-gun (JP); Toshinori Noda, Soraku-gun (JP); Kazuo Imai, Kusatsu (JP)

(73) Assignee: Matsushita Refrigeration Company, Osaka (JP)

( * ) Notice: Subject to any disclaimer, the term of this patent is extended or adjusted under 35 U.S.C. 154(b) by 0 days.

(21) Appl. No.: 09/622,130

(22) PCT Filed: Feb. 17, 1999

(86) PCT No.: PCT/JP99/00683

§ 371 (c)(1),
(2), (4) Date: Nov. 1, 2000

(87) PCT Pub. No.: WO99/42771

PCT Pub. Date: Aug. 26, 1999

(30) Foreign Application Priority Data

| Feb. 20, 1998 | (JP) | 10-38407 |
| Feb. 24, 1998 | (JP) | 10-41659 |
| Apr. 16, 1998 | (JP) | 10-105979 |

(51) Int. Cl.[7] ............................. F25D 11/02; F25B 5/00
(52) U.S. Cl. ............................. 62/441; 62/408; 62/199
(58) Field of Search ........................... 62/441, 408, 119, 62/117, 414, 417, 419, 440, 447

(56) References Cited

U.S. PATENT DOCUMENTS

| 3,364,695 | A | * | 1/1968 | Saunders et al. | |
| 4,788,832 | A | * | 12/1988 | Aoki et al. | 62/441 X |
| 5,261,247 | A | * | 11/1993 | Knezic et al. | 62/117 |
| 5,388,427 | A | * | 2/1995 | Lee | 62/441 X |
| 5,392,615 | A | | 2/1995 | Lim | |
| 5,465,591 | A | * | 11/1995 | Cur et al. | 62/199 X |
| 5,477,915 | A | * | 12/1995 | Park | 62/199 X |
| 5,551,252 | A | | 9/1996 | Lee | |
| 5,720,180 | A | | 2/1998 | Suh | |
| 5,758,512 | A | * | 6/1998 | Peterson et al. | 62/441 X |
| 5,768,898 | A | * | 6/1998 | Seok et al. | 62/440 X |

FOREIGN PATENT DOCUMENTS

| DE | 84 24 330 | | 5/1985 |
| EP | 5-71850 | | 3/1993 |
| EP | 0 593 194 | | 4/1994 |
| GB | 2 123 180 | | 1/1984 |
| JP | 05071850 | A * | 3/1993 |
| JP | 8-210753 | | 8/1996 |
| JP | 08247638 | A * | 9/1996 |
| WO | WO96/15413 | A1 * | 5/1996 |
| WO | 96/15413 | | 5/1996 |

* cited by examiner

*Primary Examiner*—Chen-Wen Jiang
(74) *Attorney, Agent, or Firm*—Wenderoth, Lind & Ponack, L.L.P.

(57) ABSTRACT

A bottom-freezer refrigerator comprises a generally rectangular box-like refrigerator housing including a top division and a bottom division with an adiabatic partition wall intervening between the top and bottom divisions. The top division has a refrigerator chamber and a crisper chamber both defined therein. The bottom division has a freezer compartment defined therein. The bottom-freezer refrigerator of the structure described above also comprises a first cooler provided in the top division at a location spaced from a rear wall portion of the crisper chamber, a first circulating fan disposed in the vicinity of the first cooler, a second cooler provided in the bottom division, and a second circulating fan disposed in the vicinity of the second cooler. The refrigerator chamber and the crisper chamber are cooled by the first cooler in cooperation with the first circulating fan, whereas the freezer compartment is cooled by the second cooler in cooperation with the second circulating fan.

42 Claims, 9 Drawing Sheets

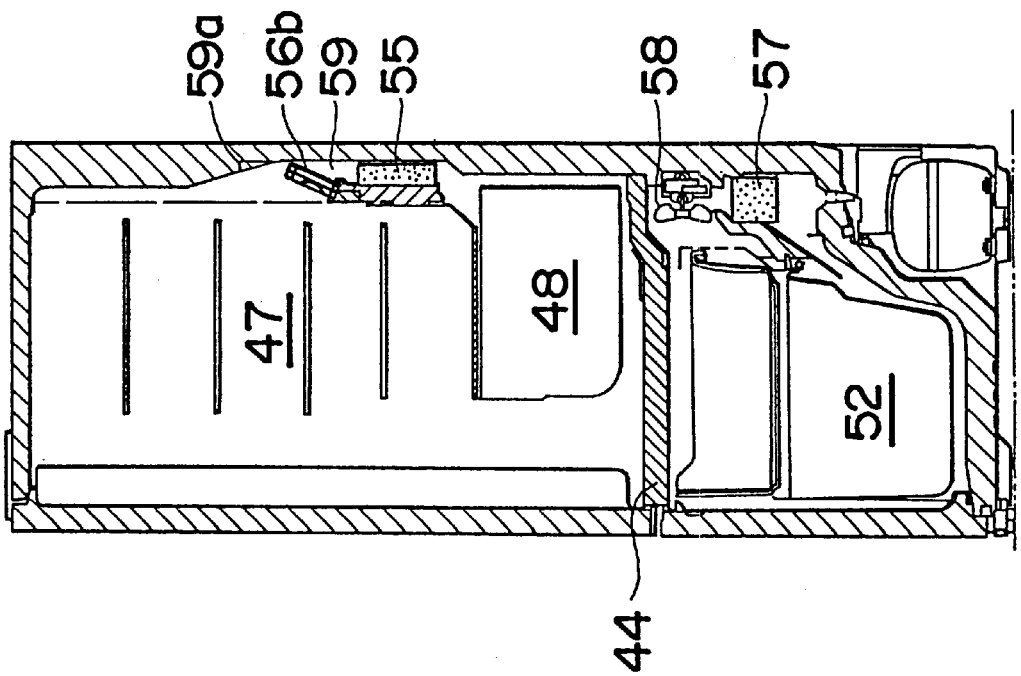
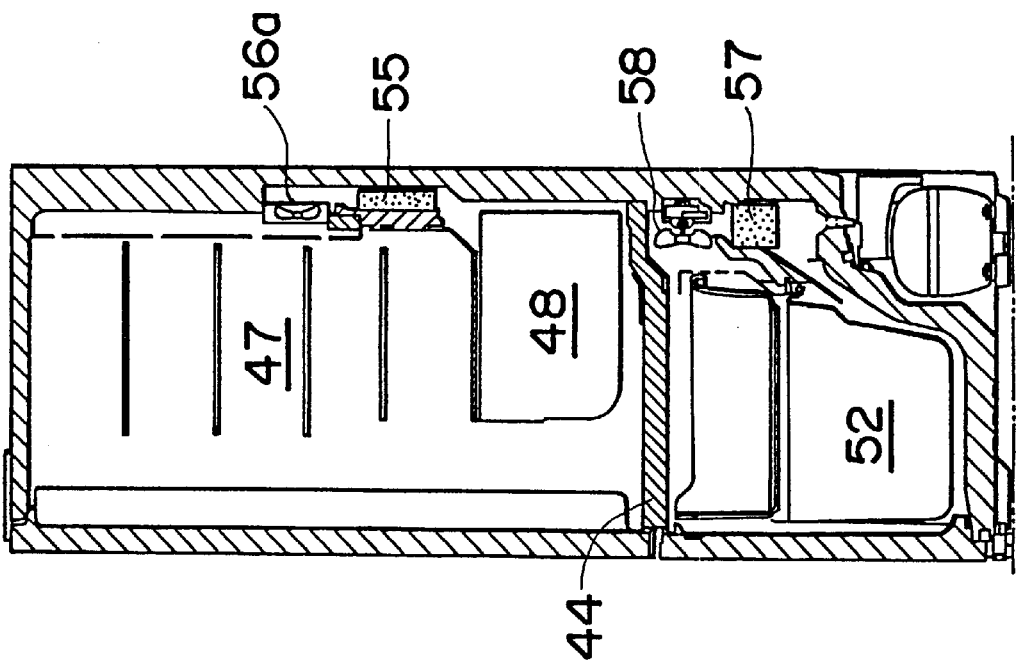

REFRIGERATOR

TECHNICAL FIELD

The present invention relates to a refrigerator of a type having a refrigerator compartment, including a vegetable storage chamber, and a freezer compartment defined below the refrigerator compartment.

BACKGROUND ART

It is well known that the refrigerator has a plurality of utility compartments, respective inside temperatures of which are controlled to a different temperature appropriate for storage of particular food materials. The refrigerator very popular in the art has a freezer compartment defined at top of the refrigerator housing and a refrigerator compartment defined in the refrigerator housing at a location below the freezer compartment, and is generally referred to as a top-freezer refrigerator. The refrigerator compartment is usually divided into a refrigerating chamber and a crisper or vegetable storage chamber generally defined below the refrigerating chamber.

However, in view of ease of use, a bottom-freezer refrigerator has recently come into the mainstream. In the bottom-freezer refrigerator, the refrigerator compartment is positioned below the refrigerator compartment with the crisper located at the bottom of the refrigerator compartment. An example of this bottom-freezer refrigerator is disclosed in, for example, the Japanese Laid-open Patent Publication No. 5-71850.

Some prior art bottom-freezer refrigerators will now be discussed with reference to the accompanying drawings and particularly to FIGS. 9 to 11. Referring first to FIG. 9, the known bottom-freezer refrigerator comprises a generally rectangular box-like refrigerator housing 1, the interior of which is divided into a freezer compartment 2 and a refrigerator compartment 3 defined above the freezer compartment 2 and separated therefrom by means of an adiabatic partition wall 4. The freezer compartment 2 has an engine chamber 5 defined therein at a location rearwards of the refrigerator compartment 2 with respect to and opposite to a front door assembly (not shown), for accommodating therein a cooler 6 and a circulating fan 7 for creating a forced draft of cooling air. The refrigerator compartment 3 has a crisper or vegetable storage chamber 9 defined or positioned therein at the bottom thereof, and a low-temperature storage chamber 10 such as, for example, a chilled chamber or a partial freezing chamber defined or positioned therein at a location above the crisper 9. Reference numeral 8 represents a first cooled air return passage defined inside the engine chamber 5.

Reference numeral 11 represents an automatic temperature controller disposed at a lower rear deep area of the refrigerator compartment 3, in which controller 11 there are disposed a first cooled air supply regulator 12 for controlling the supply of a cooled air into the refrigerator compartment 3, a second cooled air supply regulator 13 for regulating the supply of the cooled air into the low-temperature storage chamber 10, a first cooled air discharge passage 14 for discharging the cooled air from the refrigerator compartment 3, a second cooled air discharge passage 15 for discharging the cooled air from the low-temperature storage chamber 10, and a second cooled air return passage 16 communicated with the first cooled air return passage 8. Reference numeral 17 represents a return port defined in a rear wall of the low-temperature storage chamber 10 and communicated with the second cooled air return passage 16 within the automatic temperature controller 11. Reference numeral 18 represents a discharge port communicated with the low-temperature storage chamber 10 and fluid-connected with the second cooled air discharge passage 15. Reference numeral 19 represents a return port defined in a rear wall of the refrigerator compartment 3 and communicated with the second cooled air return passage 16 within the automatic temperature controller 11. Reference numeral 20 represents a discharge duct having a cooled air discharge port 21 communicated with the refrigerator compartment 3, and communicated with the first cooled air discharge passage 14.

The flow of the cooled air in the prior art refrigerator shown in FIG. 9 will be discussed. Air cooled by the cooler 6 is forcibly supplied by the circulating fan 7 in part to the refrigerator compartment 3 through the first cooled air discharge passage 14, the first cooled air supply regulator 12 and the discharge duct 20 and in part to the low-temperature storage chamber 10 through the second cooled air discharge passage 15, the second cooled air supply regulator 13 and the discharge port 18. The cooled air supplied into the refrigerator compartment 3 flows through the return port 19 and the cooled air supplied into the low-temperature storage chamber 10 flows through the return port 17. The cooled air from the return port 19 and the cooled air from the return port 17 are subsequently returned to the cooler 6 through the second cooled air return passage 16 and the first cooled air return passage 8, respectively. In this way, the cooled air circulated within the refrigerator through the various compartments and chambers to cool those compartments and chambers to respective predetermined temperatures.

FIGS. 10 and 11 illustrate another prior art bottom-freezer refrigerator. The known bottom-freezer refrigerator best shown in FIG. 10 comprises a generally rectangular box-like refrigerator housing 22, the interior of which is divided into a refrigerator compartment 24 and a freezer compartment 25 defined below the refrigerator compartment 24 and separated therefrom by means of an adiabatic partition wall 23. The refrigerator compartment 24 which is most frequently utilized in home has a removable crisper box 26 mounted inside the refrigerator compartment 24 and slidably resting on the adiabatic partition wall 23. The refrigerator compartment 24 accommodates therein a first cooler 27, a first circulating fan 28 and a first temperature detecting means 29 for detecting the inside temperature of the refrigerator compartment 24. On the other hand, the freezer compartment 25 accommodates therein a second cooler 30, a second circulating fan 31 and a second temperature detecting means 32 for detecting the inside temperature of the refrigerator compartment 24.

As shown in FIG. 11, the refrigerating system employed in the refrigerator shown in FIG. 10 includes a compressor 33, a condenser 34, a decompressor 35, the first cooler 27 and the second cooler 30, all of which are fluid-connected in the order specified above.

Cooling of the refrigerator of the structure shown in FIGS. 10 and 11 is generally carried out by driving the compressor 33 in response to a signal from the temperature detecting means 32 disposed in the freezer compartment 25. Simultaneously with the drive of the compressor 33, the first and second circulating fans 28 and 31 are also driven to forcibly circulate the cooled air within the refrigerator compartment 24, including the crisper box 26, and the freezer compartment 25 to cool and freeze the food materials accommodated therein, respectively. When the freezer compartment 25 is cooled to a predetermined temperature as a result of the cooling operation, the compressor 33 is brought to a halt in response to a signal from the temperature detecting means 32. On the other hand, when the temperature detected by the temperature detecting means 29 is higher than a predetermined cut-in temperature, the first circulating fan 28 continues its rotation to circulate within and cool the refrigerator compartment 24, but when the inside temperature of the refrigerator compartment 24 lowers to such an extent that the temperature detected by the temperature detecting means 29 is lower than a predetermined cut-off temperature, the first circulating fan 28 is brought to a halt.

With the first-described prior art refrigerator, a problem has been found that since the cooled air is circulated through the various compartments and chambers, a relatively large number of the air passages are required, resulting in reduction of the maximum available capacity of the refrigerator. Also, the refrigerating system employed therein requires some or all of the air passages to have an increased length from the cooler 6 to the respective compartment or chamber, resulting in reduction in cooling efficiency.

In addition, in the first-described prior art refrigerator, the single cooler 6 is utilized to cool all of the compartments and chambers and is therefore so bulky in size that the adiabatic partition wall 4 is required to be installed at a relatively high level, for example, about 900 mm or more above a support surface such as, for example, a house floor. This makes it difficult to remove or place food materials from or into the crisper chamber 9 that is placed at such a high level above the support surface.

The use of the single cooler 6 to cool all of the compartments and chambers requires the evaporation temperature of the cooler to be designed to a value equal to the lowest available temperature of the freezer compartment 2 and, consequently, the efficiency of the refrigerating system is limited.

Again, considering that the automatic temperature controller 11 is communicated with the freezer compartment 2, the automatic temperature controller 11 is thermally conducted to the crisper chamber 9 within the refrigerator compartment 3 to cool the crisper chamber 9 so excessively that the food materials, particularly vegetables, within the crisper chamber 9 may be frozen undesirably.

On the other hand, the second-described prior art refrigerator shown in FIGS. 10 and 11 is effective to eliminate a possible excessive cooling of the crisper chamber such as occurring in the refrigerator of FIG. 9 and also to eliminate the problems associated with the reduction in capacity and reduction in cooling efficiency of the refrigerating system both resulting from the use of the increased length of the air passage. However, when it comes to installation of the first cooler 27 at a location rearward of the refrigerator compartment 24 and opposite to the front door assembly, a problem would arise that if continued cooling of the freezer compartment 25 is required even though the first circulating fan 28 is brought to a halt as a result of the refrigerator compartment 24 having been cooled sufficiently, a coolant still flows in the first cooler 27 and therefore the refrigerator compartment 24 may be excessively cooled by natural convection. Also, a local area of the crisper box 28 disposed relatively close to the first cooler 27 may be excessively cooled by the first cooler 27 and this is indeed problematic in terms of vegetables kept crisp.

Considering that the second-described prior art refrigerator has a substantial weight and that the crisper box 26 within the refrigerator compartment 24 is held in contact with the bottom thereof, that is defined by an upper surface of the adiabatic partition wall 23, while the first cooler 27 is disposed rearward of the crisper box 26, the crisper box 26 cannot have a sufficient distance between its front and rear walls and would therefore have a relatively small capacity to accommodate the vegetables.

The freezer compartment 25, although less frequently used than the refrigerator compartment 24, is required to have an increased effective capacity. For this reason, if design is made to reduce the depth of the second cooler 30, but to increase the height of the second cooler 30, there is the possibility that the adiabatic partition wall 23 must be reduced in thickness or shifted in position upwardly to accommodate the increased height of the second cooler 30. If the adiabatic partition wall 23 is shifted in position upwardly, the capacity of the refrigerator compartment 24, that is frequently used, would be reduced, posing a problem associated with the proportion of capacity between the freezer compartment 25 and the refrigerator compartment 24. To observe the design proportion in capacity between the refrigerator compartment 24 and the freezer compartment 25 would result in complication of the rear structure of the adiabatic partition wall 23, accompanied by increase in cost of manufacture of the refrigerator along with reduction in production thereof.

Accordingly, the present invention has been devised to eliminate the problems inherent in the prior art bottom-freezer refrigerator and is intended to provide an improved bottom-freezer refrigerator effective to secure sufficiently required capacities with a simplified air passage structure.

Another important object of the present invention is to provide an improved bottom-freezer refrigerator of the type referred to above capable of exhibiting a high cooling efficiency even though the air passage structure is simplified.

A further object of the present invention is to provide an improved bottom-freezer refrigerator of the type referred to above, having no possibility of food materials within the refrigerator compartment and the crisper chamber or box being cooled excessively.

A still further object of the present invention is to provide an improved bottom-freezer refrigerator of the type referred to above, that provides an ease of use and particularly that of a zone of high utility in a household work.

DISCLOSURE OF THE INVENTION

In order to accomplish these objects, the present invention according to one aspect thereof provides a bottom-freezer refrigerator comprises a generally rectangular box-like refrigerator housing including a top division and a bottom division with an adiabatic partition wall intervening between the top and bottom divisions. The top division has a refrigerator chamber and a crisper chamber both defined therein, which crisper chamber is, although not exclusively, dedicated to accommodate food materials required to be kept crisp such as, for example, vegetables. The bottom division has a freezer compartment defined therein.

The bottom-freezer refrigerator of the structure described above also comprises a first cooler provided in the top division at a location spaced from a rear wall portion of the crisper chamber, a first circulating fan disposed in the vicinity of the first cooler, a second cooler provided in the bottom division, and a second circulating fan disposed in the vicinity of the second cooler. The refrigerator chamber and the crisper chamber are cooled by the first cooler in cooperation with the first circulating fan, whereas the freezer compartment is cooled by the second cooler in cooperation with the second circulating fan.

According to the present invention, the capacity of the refrigerator can be secured by utilizing the simplified air passage structure. More specifically, no air passage that extend completely across the adiabatic partition wall is employed to thereby simplify the air passage structure having a reduced length thereof. Shortening of the air passage results in reduction in resistance and, therefore, the top and bottom divisions can be independently cooled by the first and second coolers in cooperation with the first and second circulating fans, respectively, to accomplish a high cooling efficiency. Also, since the first cooler is installed at a location deep rearward of the crisper chamber, neither does thermal conduction to the crisper chamber occur, but the depth of the crisper chamber will not be invaded.

Preferably the crisper chamber is divided into upper and lower rooms so that relatively heavy and/or bulky food materials can be placed in or removed from the crisper chamber which is used highly frequently, at a position convenient to the user. The use of the a low-temperature chamber inside the refrigerator chamber preferably above the crisper chamber and having a capacity smaller than that of the crisper chamber is, if cooled by the first cooler in cooperation with the first circulating fan, effective to substantially eliminate any possible variation in temperature.

Preferably, assuming that the first cooler has a height a, a width b and a depth c and the second cooler has a height A, a width B and a depth C, the first and second coolers have respective sizes that satisfy at least the following relation:

A<a and C>c

This feature makes it possible to use the first cooler of a lean structure sufficient to secure a depth of a zone of high utility and also to use the second cooler of a reduced height to make it possible to expand the zone of high utility.

In addition, in order to render the bottom-freezer refrigerator of the present invention to be more user-friendly and convenient to use, it is preferred that a lower end of the first cooler is positioned a distance of 900 to 1,500 mm above a support surface on which the refrigerator is placed and an upper end of the second cooler is positioned a distance of 400 to 700 mm above the support surface.

In any event, these and other features of the present invention will become clear from the detailed description of preferred embodiments of the present invention which follows with reference to the accompanying drawings.

BRIEF DESCRIPTION OF THE DRAWINGS

FIGS. 3 and 4 are schematic longitudinal side sectional views of the bottom-freezer refrigerator according to second and third preferred embodiments of the present invention, respectively;

Figure 1:
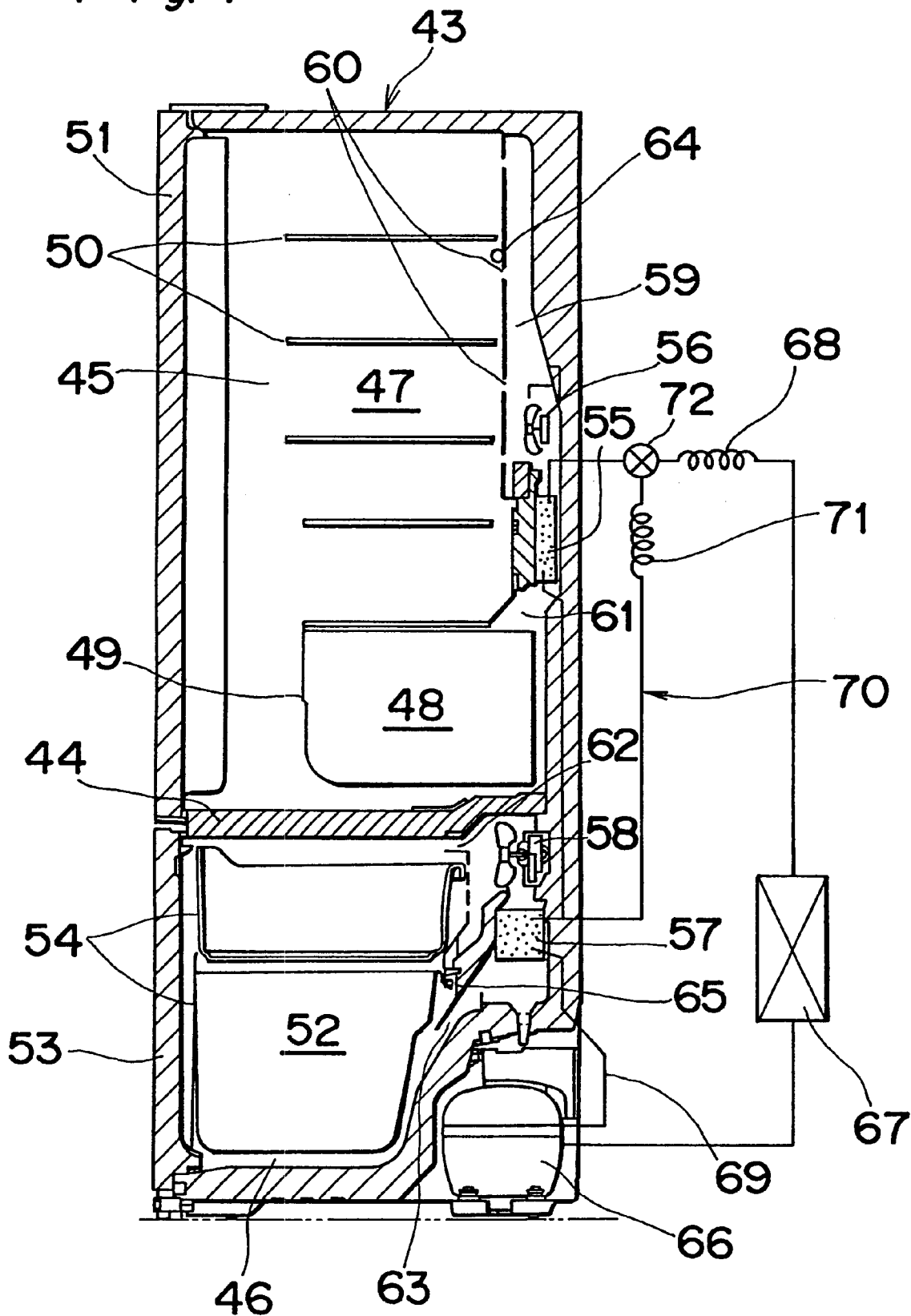
FIG. 1 is a schematic longitudinal side sectional view of a bottom-freezer refrigerator according to a first preferred embodiment of the present invention, shown together with a refrigerating fluid circuit.
Figure 2:
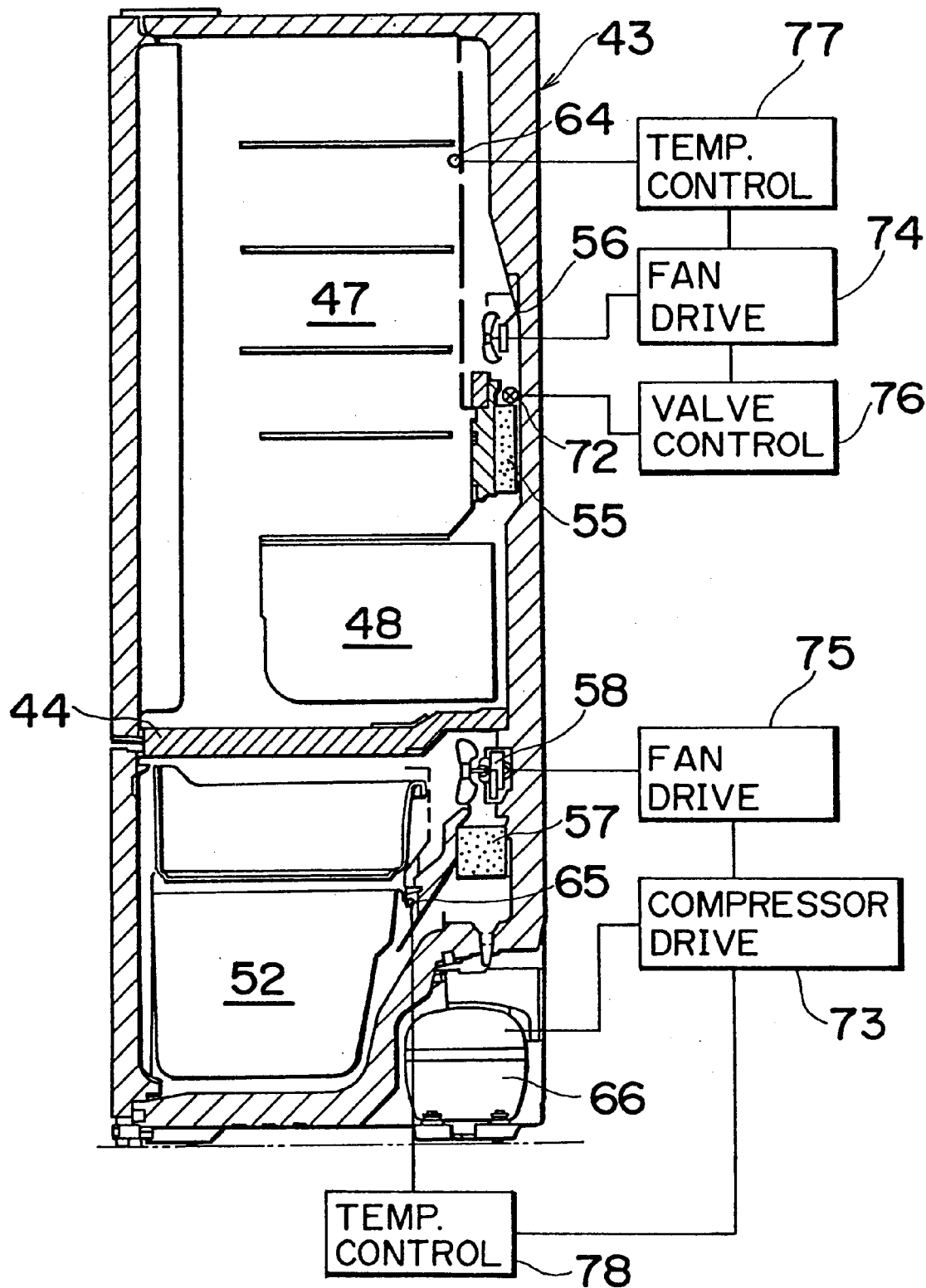
FIG. 2 is a view similar to FIG. 1, showing the refrigerator together with functional blocks of a refrigerating system.

DETAILED DESCRIPTION OF THE PREFERRED EMBODIMENTS (First Embodiment—FIGS. 1 and 2)

Referring now to FIG. 1, a bottom-freezer refrigerator according to the first preferred embodiment of the present invention comprises a generally rectangular box-like housing 43 having its interior divided by an adiabatic partition wall 44 into a top division 45 and a bottom division 46. The top division 45 has a refrigerator chamber 47 defined therein and a crisper chamber 48 also defined therein at a location below the refrigerator chamber 47. The crisper chamber 48 shown therein is in the form of a storage container 49 capable of being drawn frontward and rearward in a direction close to and away from a hingedly supported front door 51 adapted to selectively open and close a front opening of the top division 45. The storage container 49 is placed full deep inside the refrigerator chamber 45 with a space left between a rear wall of the storage container 49 and a rear interior wall of the refrigerator chamber 45 for passage therethrough of a cooled air inside the refrigerator chamber 45. The refrigerator chamber 45 has a plurality of shelves 50 dividing the interior of the refrigerator chamber 45 into a corresponding number of rooms that are freely communicated with each other.

The bottom division 52 has a freezer compartment 52 defined therein so as to open forwards at a location immediately below the hingedly supported door 51 and including a drawing door 53 adapted to close the front opening leading into the freezer compartment 52. This drawing door 53 is so configured that when the drawing door 53 is pulled forwards in a direction away from the refrigerator, upper and lower freezer containers 54 both opening upwardly can be drawn out of the freezer compartment 52 having been guided by and along rails (not shown). It is to be noted that the adiabatic partition wall 44 is installed at a level 650 mm above a support surface, for example, a floor on which the refrigerator is placed upright.

Reference numeral 55 represents a first cooler forming a part of a refrigerating fluid circuit and installed at a location rearward of the refrigerator chamber 47 and spaced upwardly from the rear wall portion of the crisper chamber 48. Positioned immediately above the first cooler within the refrigerator chamber 47 is a first circulating fan 56. A second cooler 57 associated with the freezer compartment 52 is installed deep rearward of the freezer compartment 52, and a second circulating fan 58 is positioned above the second cooler 57. Reference numeral 59 represents a refrigerator air passage defined rearward of the refrigerator chamber 47 and through which an air cooled by the first cooler 55 is circulated by the first circulating fan 56 into the refrigerator compartment by way of a plurality of vent holes 60 opening towards the respective rooms each between the shelves 50. Reference numeral 61 represents a cooled air return port defined deep rearward of the crisper chamber 48 and communicated with the first cooler 55.

Reference numeral 62 represents a freezer discharge port opening into the freezer compartment 52 and communicated with the second circulating fan 58. Reference numeral 63 represents a cooled air return port defined deep rearward of the freezer compartment 52 and communicated with the second cooler 57. Reference numeral 64 represents a refrigerator temperature detecting means such as, for example, a thermistor provided inside the refrigerator chamber 47 and reference numeral 65 represents a freezer temperature detecting means such as, for example, a thermistor provided inside the freezer compartment 52.

The refrigerating fluid circuit includes a compressor 66 disposed at a bottom rear location of the refrigerator housing 43, a condenser 67, a first decompressor 68 comprised of, for example, a capillary tube and a suction tube 69. The compressor 66, the condenser 67, the first capillary tube or decompressor 68, the first cooler 55, the second cooler 57 and the suction tube 69 are fluid-connected with each other in this order to thereby complete a closed loop of the refrigerating fluid circuit. A discharge end of the first capillary tube 68 is fluid-connected directly with the second cooler 57 through a by-pass circuit 70 including a second decompressor 71 comprised of, for example, a capillary tube. Reference numeral 72 represents a valving device disposed at an entrance to the first cooler 55 for switching a coolant circuit over to the by-pass circuit 70. This valving device 72 is, in the illustrated embodiment, employed in the form of a motor-driven self-holding valve of a type which is driven by a stepper motor in response to an electrical input and consumes an electric power only during a valving action performed thereby.

When a valving device 72 is opened, a coolant flows extensively towards the first cooler 55 by the action of a difference in resistance in the coolant circuit, but when the valving device 72 is closed, the coolant flows only through the by-pass circuit 70, having by-passed the first cooler 55, towards the second cooler 57 by way of the second capillary tube 71. In other words, this valving device 72 is of a design capable of assuming one of a first valve or open position, in which the coolant is permitted to flow towards the first cooler 55, and a second valve or closed position in which the coolant is permitted to flow towards the second cooler 57 through the by-pass circuit 70 without reaching the first cooler 55.

Referring to FIG. 2, the compressor 66 is driven by a compressor drive means 73; the first circulating fan 56 is driven by a first fan drive means; the second circulating fan 58 is driven by a second fan drive means 75; and the valving device 72 is driven by a valve control means 76 so as to assume one of the first and second valve positions. Reference numeral 77 represents a refrigerator temperature control means for controlling the temperature inside the refrigerator chamber 47 in response to the temperature detected by the refrigerator temperature detecting means 64. Reference numeral 78 represents a freezer temperature control means for controlling the temperature inside the freezer compartment 52 in response to the temperature detected by the freezer temperature detecting means 65.

The bottom-freezer refrigerator of the structure described above and shown in FIGS. 1 and 2 operates in the following manner.

Assuming that the freezer temperature detecting means 65 detects that the temperature inside the freezer compartment 52 is higher than an upper limit, for example, −18° C. of a predetermined freezer temperature range, the compressor drive means 73 drives the compressor 66 based on an output from the freezer temperature control means 78. Substantially simultaneously therewith, the second fan drive means 75 drives the second circulating fan 58. If at this time the refrigerator temperature detecting means 64 detects that the temperature inside the refrigerator compartment is lower than a lower limit, for example, 2° C. of a predetermined refrigerator temperature range, the valve control means 76 causes the valving device 72 to assume the second valve or closed position based on an output from the refrigerator temperature control means 77.

Accordingly, a high-temperature coolant gas under pressure from the compressor 66 is supplied into the condenser 67 where the coolant gas is liquefied with heat dissipated, and the resultant low-temperature coolant liquid is subsequently decompressed as it flows through the first capillary tube 68. The low-temperature coolant liquid emerging from the first capillary tube 68 is supplied to the second cooler 57 through the by-pass circuit 70 since the valving device 72 is at this time held in the second valve or closed position.

During the drive of the second circulating fan 58 to create a forced draft of cooling air, heat-exchange tapes place in the second cooler 57 to provide a cooled air which is subsequently circulated into the freezer compartment 52 through the freezer discharge port 62 after having flown through the second cooler 57.

The coolant within the second cooler 57, after having been gasified, returns to the compressor 66 through the suction tube 69. In the event that the refrigerator temperature detecting means 64 then monitoring the temperature inside the refrigerator chamber 47 at a predetermined interval detects that the temperature inside the refrigerator chamber 47 is higher than an upper limit, for example, 3° C. of the predetermined refrigerator temperature range, the valving device 71 is brought to the first valve or open position by the valve control means 76 then driving the valving device 71 based on an output from the refrigerator temperature control means 77 and, at the same time, the first circulating fan 56 is driven by the first fan drive means 74.

At this time, the low-temperature coolant which has been decompressed as it flows through the first capillary tube 68 will hardly flow into the by-pass circuit 70 having the second capillary tube 71 providing a high resistance to flow and passes through the valving device 72, a majority of the low-temperature coolant being consequently circulated in the coolant circuit through the first cooler 55 and then through the second cooler 57. Accordingly, during the first circulating fan 56 being driven, heat-exchange takes place in the first cooler 55 to allow the latter to provide an cooled air which is subsequently supplied into the refrigerator chamber 47 through the refrigerator air passage 58 by way of the refrigerator vent holes 60 to thereby cool the refrigerator chamber 47. The cooled air supplied into the refrigerator chamber 47 flows through the space between the storage container 49 within the crisper chamber 48 and the adiabatic partition wall 44 to cool the crisper chamber 48 indirectly and finally returns to the first cooler 55 through the return port 61.

In the event that the refrigerator temperature detecting means 64 subsequently detects that the temperature inside the refrigerator chamber 47 is lower than the lower limit, for example, 2° C. of the predetermined refrigerator temperature range, the valve control means 76 caused the valving device 72 to assume the second valve or closed position based on the output from the refrigerator temperature control means 77 and the first fan drive means 74 is in activated to bring the first circulating fan 56 to a halt. On the other hand, in the event that the freezer temperature detecting means 65 detects that the temperature inside the freezer compartment 52 is lower than a lower limit, for example, −20° C. of the predetermined freezer temperature range, the compressor drive means 73 causes the compressor 66 to be brought to a halt based on an output from the freezer temperature control means 78 and, substantially at the same time, the second fan drive means 75 is inactivated to bring the second circulating fan 58 to a halt.

In the bottom-freezer refrigerator according to the first preferred embodiment of the present invention, since the freezer compartment 52 and the refrigerator compartment including the refrigerator chamber 47 and the crisper chamber 48 are cooled through the separate air passages, no lengthy air passage of a kind passing completely across the adiabatic partition wall 44 is required and the various compartments can be effectively cooled with the simplified air passage structure, allowing the refrigerator to secure a sufficiently effective capacity.

Also, since the air passage is reduced in length accompanied by reduction in resistance to the air flow, the power required to drive the circulating fans to secure the required amount of the air can be reduced advantageously. Accordingly, not only can the efficiency of supply of the air be increased, the first and second circulating fans 56 and 58 can be assembled compact. In addition, reduction in length of the air passage minimizes a loss of heat which would otherwise result from absorption of heat as the cooled air flow through the air passage, accompanied by increase of the cooling efficiency.

Moreover, since the refrigerator housing is divided by the adiabatic partition wall 44 into the top and bottom divisions 45 and 46 each equipped with the dedicated cooler and the dedicated circulating fan, the evaporation temperature of the respective cooler can be designed of a value appropriate to either the refrigerator compartment or the freezer compartment. More specifically, with respect to the refrigerator and crisper chambers 47 and 48 in the top division 45 where food materials are stored at a temperature higher than, for example, 0° C., the evaporation temperature of the first cooler 55 can be chosen to be higher than that of the second cooler 57 to minimize the difference between it and the temperature at which the food materials are stored, to thereby avoid any possible excessive cooling and/or dehydration. Also, increase of the evaporation temperature is effective to enhance the efficiency of the refrigerating cycle (i.e., cooling capacity/compressor power) to minimize the consumption of the electric power.

If the valving device 72 provided at the entrance to the first cooler 32 for switching the coolant circuit is employed in the form of a two-way sluice valve designed to allow the coolant to flow only through the by-pass circuit during the closure thereof, the refrigerating cycle can be designed inexpensive as compared with the use of, for example, a three-way valve for selectively switching the cooling circuit.

In addition, since the valving device 72 is of a design driven by the stepper motor to assume one of the open and closed positions, the valving device 72 may be a self-holding type which consumes an electric power only when it is driven to assume one of the open and closed positions and requires no input which would otherwise be required in the case of, for example, a valve of a type driven by an electromagnet, during a period in which the valve is held in one of the open and closed positions. Accordingly, the input to the valve is reduced accompanied by reduction of the electric power consumption and the valve will not be adversely affected by heat evolved in the valve, making it possible to manufacture the refrigerator at a reduced cost with no insulation required in the valve.

In the bottom-freezer refrigerator according to the first preferred embodiment of the present invention, the first cooler 55 is not installed at a location deep rearward of the crisper chamber 48 and, therefore, there is no possibility that food materials such as vegetables and/or fruits having a high water content that are accommodated within the storage container 49 will be excessively cooled and, hence, damaged by a heat conduction to the crisper chamber 48. In addition, since the depth of the crisper chamber 48 as measured in a direction from the front door 51 to the rear wall of the housing is not inroaded, the capacity of the storage container 49 is sufficiently secured, permitting elongated food materials such as Chinese cabbages and/or leeks to be snugly accommodated within the storage container 48. For this reason, the vegetables and/or fruits which are utilized highly frequently and also which are consumed often can be stored in an appropriate environment.

Furthermore, according to the refrigerating cycle employed in this embodiment of the present invention, the coolant can flow into the first cooler 55 only when the refrigerator chamber 47 is required to be cooled, but the coolant does not flow through the first cooler 55 when the refrigerator chamber 47 is sufficiently cooled. In other words, only when the refrigerator chamber 47 and the crisper chamber 48 are to be cooled, the coolant can be selectively passed through the first cooler 55.

Accordingly, when the ambient temperature in a house room in which the refrigerator is installed is so low that the refrigerator chamber 47 need not be cooled, for example, during the winter season, the coolant will rarely flow through the first cooler 55 that is installed rearward of the refrigerator chamber 47, since the cooled air will no stagnate in the vicinity of a lower region of the refrigerator chamber 47 and the crisper chamber 48 due to natural convection, there is no possibility that the food materials within the refrigerator chamber 47 and/or the crisper chamber 48 will be excessively cooled. In particular, the crisper chamber 48 has its bottom separated from the freezer compartment 52 by the intervention of the adiabatic partition wall 44, there is no possibility that the food material within the crisper chamber 48 may be frozen by thermal conduction from the freezer compartment 52.

The second cooler 57 is dedicated to cool only the freezer compartment 52 and, therefore, the second cooler 57 may be of a compact type having a relatively low heat-exchange capability. Accordingly, the second cooler 57 and the second circulating fan 58 can have a reduced height, permitting the adiabatic partition wall 44 above those components 57 and 58 to be lowered in position and, accordingly, the bottom of the crisper chamber 48 where relatively heavy food materials are frequently stored can be defined at a level 550 to 800 mm, preferably 650 mm, above the support surface. Thus, the present invention is effective to provide the bottom-freezer refrigerator of a design wherein the user can conveniently place or remove food materials into or from the crisper chamber 48 at a waist level.

Yet, the freezer compartment 52 at a lower region of the refrigerator housing 43 is of a design wherein when the drawing door 53 is pulled outwards the top opening of the storage container 54 can be exposed to the outside of the refrigerator, allowing the user to look into the storage container 43. Accordingly, the user can pleasantly place or remove food materials into or from the storage container 54 at a position level with his or her knees.

In describing the bottom-freezer refrigerator according to the foregoing embodiment of the present invention, each of the first and second coolers 55 and 57 is employed in the form of a heat-exchanger of a fin-and-tube type together with the respective fan, but may be employed in the form of a plate-type cooler capable of accomplishing a direct cooling by the effect of a natural convection. Also, although the first cooler 55 has been shown as positioned above and rearward of the crisper chamber 48, it may be installed in a ceiling or a side wall of the refrigerator chamber 47 and even in such case similar effects can be obtained.

(Second Embodiment—FIG. 3)

Referring to FIG. 3 showing the bottom-freezer refrigerator according to a second preferred embodiment of the present invention, reference numeral 56a represents a first circulating fan of a box fan type wherein a drive motor is installed in a center area of vanes, which fan 56a is installed above the first cooler 55.

According to the second embodiment, the first circulating fan 56a can have a depth smaller than that of the conventional propeller-type fan. The use of the first circulating fan 56a together with the lean first cooler 55 is effective to secure a substantial depth of the refrigerator chamber 47 as measured in a direction from the door 51 to the rear interior wall of the housing, accompanied by increase in capacity.

(Third Embodiment—FIG. 4)

Referring to FIG. 4 showing the bottom-freezer refrigerator according to a third preferred embodiment of the present invention, reference numeral 56a represents a first circulating fan of a box fan type wherein a drive motor is installed in a center area of vanes, which fan 56a is installed above the first cooler 55 in a fashion inclined an angle of 60 to 80° relative to the horizontal plane so that the cooled air can be blown upwardly for circulation within the refrigerator chamber 47.

According to the third embodiment of the present invention described above, the air cooled by the first cooler 55 can be forcibly sucked onto the first circulating fan 56b. However, since the first circulating fan 56b is in the form of the lean box fan and inclined 60 to 80° relative to the horizontal plane, an adiabatic wall 59a forming the refrigerator air passage 59 has a wall surface smoothly inclined at an angle corresponding to the angle of inclination of the box fan which is the first circulating fan 56b, to thereby minimize a duct resistance. For this reason, not only can an efficient circulation of the cooled air in a direction upward within the refrigerator chamber 47 be accomplished, but generation of noises from the first circulating fan 56b can also be reduced. In addition, the depth of the refrigerator air passage 59 can advantageously be reduced, thereby increasing the effective capacity of the refrigerator chamber 47.

Figure 5:
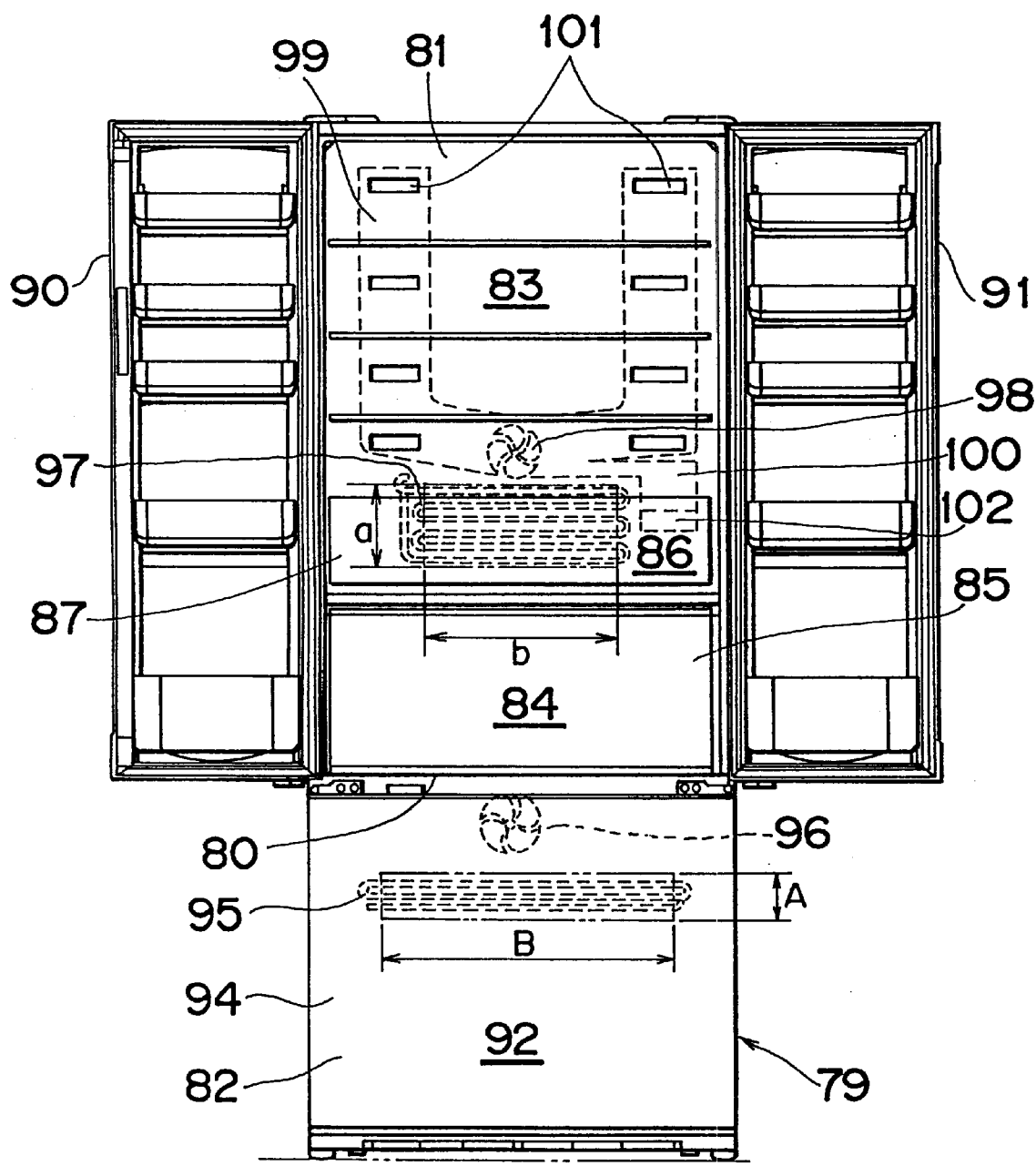
FIG. 5 is a schematic front elevational view of the bottom-freezer refrigerator according to a fourth preferred embodiment of the present invention.
Figure 6:
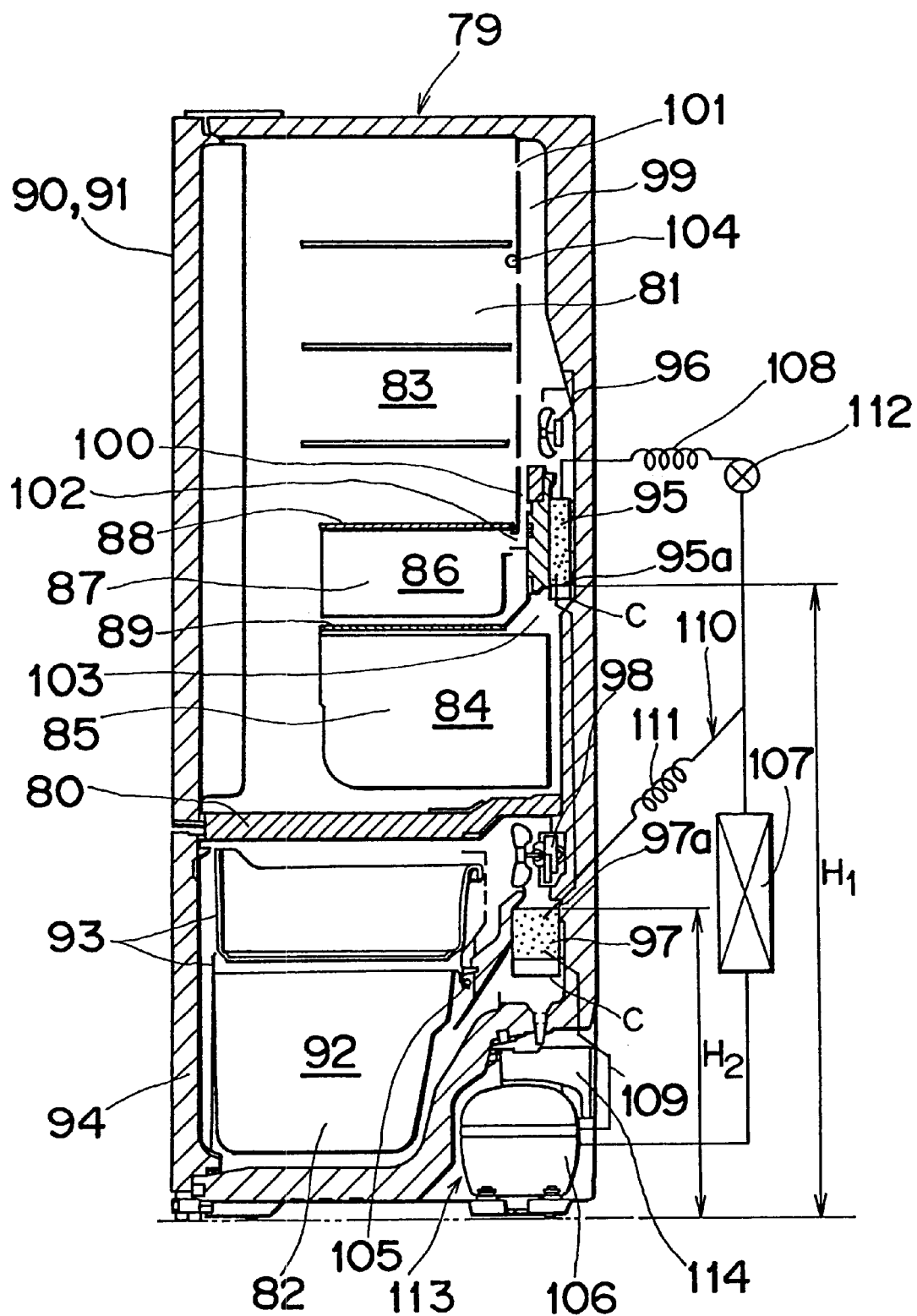
FIG. 6 is a schematic longitudinal side sectional view of the refrigerator shown in FIG. 5.

(Fourth Embodiment—FIGS. 5 and 6)

Referring to FIGS. 5 and 6 showing the bottom-freezer refrigerator according to a fourth preferred embodiment of the present invention, the bottom-freezer refrigerator shown therein comprises a generally rectangular box-like housing 79 having its interior divided by an adiabatic partition wall 80 into a top division 81 and a bottom division 82. The top division 81 has a refrigerator chamber 83 defined therein and a crisper chamber 84. The crisper chamber 84 is defined therein at a location below the refrigerator chamber 83 and accommodates therein a drawing storage container 85 that can be drawn forward or rearward in a direction close to or away from a front door assembly. Reference numeral 86 represents a low-temperature chamber that is cooled to a temperature lower than that inside the refrigerator chamber 83 for chilling (0° C.) or icing or partial freezing (0 to −3° C.) and defined within the refrigerator chamber 83 at a location immediately above the crisper chamber 84. This low-temperature chamber 86 has a capacity smaller than that of the crisper chamber 84 and also has a small height than that of the crisper chamber 84 and may be used to accommodate meats and/or fishes. Reference numeral 87 represents a storage container accommodated within the low-temperature chamber 86 for movement in a direction close to and away from the front door assembly.

Heat insulating panels 88 and 89 are installed at a ceiling of the low-temperature chamber 86 and between the crisper chamber 84 and the low-temperature chamber 86.

The front door assembly used in the bottom-freezer refrigerator according to the fourth embodiment of the present invention is of a casement type including hingedly supported doors 90 and 91 for selectively opening and closing the front opening leading into the refrigerator compartment including the refrigerator chamber 83, the low-temperature chamber 86 and the crisper chamber 84.

The bottom division 82 has a freezer compartment 92 defined therein so as to open forwards at a location immediately below the front door assembly and including a drawing door 94 adapted to close the front opening leading into the freezer compartment 92. This drawing door 94 is so configured that when the drawing door 94 is pulled forwards, a storage container 93 opening upwardly can be drawn out of the freezer compartment 52 having been guided by and along rails (not shown).

Reference numeral 95 represents a first cooler of a refrigerating system disposed at a location deep rearward of the refrigerator chamber 83, which cooler 95 is installed rearward of the low-temperature chamber 86. A first circulating fan 96 cooperates with the first cooler 95 for circulating an air cooled by the first cooler 95. Reference numeral 97 represents a second cooler disposed at a location deep rearward of the freezer chamber 92 and cooperable with a second circulating fan 98 positioned above the second cooler 97 for circulating an air cooled by the second cooler 97.

Reference numeral 99 represents a first refrigerator air passage defined rearward of the refrigerator chamber 83 and through which the air cooled by the first cooler 95 can be circulated by the first circulating fan 96 into the refrigerator chamber 83, and reference numeral 100 represents a second refrigerator air passage through which the cooled air circulated by the first circulating fan 96 can be supplied into the low-temperature chamber 86. Reference numeral 101 represents a plurality of vent holes defined at desired positions in communication with the first refrigerator air passage 99 for introducing the cooled air into the refrigerator chamber 83, and reference numeral 102 represents a discharge port defined at an outlet of the second refrigerator air passage 100 for introducing the cooled air into the low-temperature chamber 86. The cooled air having been circulated within the refrigerator chamber 83 is returned through a return port 103, defined at a location deep rearward of the refrigerator chamber 83, back to the first cooler 95. The temperature inside the refrigerator chamber 83 is detected by a refrigerator temperature detecting means 104 such as, for example, a thermistor installed within the refrigerator chamber 83 whereas the temperature inside the freezer compartment 92 is detected by a freezer temperature detecting means 105 such as, for example, a thermistor installed within the freezer compartment 92.

The refrigerating fluid circuit includes a compressor 106 disposed at the bottom rear of the housing 79, a condenser 107, a first decompressor or capillary tube 108 and a suction tube 109. The compressor 106, the condenser 107, the first capillary tube 108, the first cooler 95, the second cooler 97 and the suction tube 109 are fluid-connected with each other in this order to thereby form a closed loop of the refrigerating fluid circuit. A discharge end of the first capillary tube 108 is fluid-connected directly with the second cooler 97 through a by-pass circuit 110 including a second decompressor or capillary tube 111. Reference numeral 112 represents a valving device disposed at an outlet of the first condenser 107 for switching a coolant circuit over to the by-pass circuit 110. This valving device 112 is disposed in an engine room defined outside the refrigerator, for example, at the bottom rear of the housing 79 in a manner similar to the compressor 106. The valving device 112 may be a three-way valve for selecting one of fluid passages or an electromagnetically operated two-way valve, but is preferably employed in the form of a motor-driven self-holding two-way sluice valve of a type which is driven by a stepper motor in response to an electrical input and consumes an electric power only during a valving action performed thereby.

The valving device 112 is capable of assuming one of a first valve or open position, in which the coolant can extensively flow towards the first cooler 95 by the effect of a difference in resistance in the coolant fluid circuit, and a second valve or closed position in which the coolant can flow only through the by-pass circuit 110 towards the second cooler 97 by way of the second capillary tube 111 having by-passed the first cooler 95.

The first cooler 95 is installed at a level spaced a predetermined height H1 as measured from the support surface to a bottom end 95a of the first cooler 95, whereas the second cooler 97 is installed at a level spaced a predetermined height H2 as measured from the support surface to a top end 97a of the second cooler 97. The height H1 for the first cooler 95 is preferably within the range of 900 to 1,500 mm whereas the height H2 for the second cooler 97 is preferably within the range of 400 to 700 mm.

Each of the first and second coolers 95 and 97 employed in the bottom-freezer refrigerator according to the fourth embodiment of the present invention is of a fin-and-tube type. Assuming that the first cooler 95 is of a size having a height a, a width b and a depth c and the second cooler 97 is of a size having a height A, a width B and a depth C, the both are designed to satisfy the following relationship:

$A<a, B<b$ and $C>c$

Accordingly, the first cooler 95 is so designed in consideration of the cooling performance as to have the reduced depth c and the increased height a. On the other hand, since within the freezer compartment 92 it is necessary for the second circulating fan 98 and the second cooler 97 to be installed at a position lower than an undersurface 80a of the adiabatic partition wall 80 and since an evaporation tray 114 and the compressor 106 have to be installed within the engine room 113 defined at the bottom rear of the housing 79, the second cooler 97 is so designed as to have the reduced height A.

The operation of the bottom-freezer refrigerator according to the fourth embodiment of the present invention will now be described.

As soon as the refrigerator temperature detecting means 104 detects a temperature exceeding a predetermined temperature, the first circulating fan 96 starts its operation. The air cooled by the first cooler 95 is supplied by the first circulating fan 96 into the refrigerator chamber 83 through the refrigerator air passage 99 by way of the vent holes 101. On the other hand, the cooled air is also supplied into the low-temperature chamber 86 through the low-temperature air passage 100 by way of the discharge port 102.

The cooled air so supplied into the refrigerator chamber 83 and the low-temperature chamber 86 flows through the space delimited between the storage container 85 of the crisper chamber 84 and the adiabatic partition wall 80 and then returns to the first cooler 95 through the return port 103.

However, when the refrigerator temperature detecting means 104 detects a temperature lower then the predetermined value, the first circulating fan 96 is brought to a halt. In this way, by the circulation of the cooled air within the refrigerator chamber 83 and the low-temperature chamber 86, the various chambers are cooled to respective predetermined temperatures. In addition to the crisper chamber having been cooled by the cooled air returning through the refrigerator chamber 83 and the low-temperature chamber 86, it can also be cooled by thermal conduction from the low-temperature chamber 86.

On the other hand, when the refrigerator temperature detecting means 105 detects a temperature higher than a predetermined temperature, the second circulating fan 98 is brought into operation. The air cooled by the second cooler 97 is supplied by the second circulating fan 98 into the refrigerator compartment 92. If the refrigerator temperature detecting means 105 subsequently detects the temperature lower than the predetermined temperature, the second circulating fan 98 is brought to a halt. By repeating this cycle, the refrigerator compartment 92 is cooled to the predetermined temperature.

Hereinafter, the refrigerating cycle will be described. When the freezer temperature detecting means 105 detects a temperature higher than a freezer compartment preset temperature, the compressor 106 is driven. About the same time, the second circulating fan 108 is driven. At this time, the valving device 112 is held in the closed position in the event that the refrigerator temperature detecting means 104 detects a temperature lower than a refrigerator chamber preset temperature.

As a result, a coolant gas of a high temperature under a high pressure is supplied from the compressor 106 into the condenser 107, and the coolant liquefied by the condenser 107 with heat dissipated flows into the by-pass passage 110. The coolant flowing through the by-pass passage 110 is then decompressed as it flows through the second capillary tube 111 and is then guided towards the second cooler 97.

Since a forced draft of air induced by the second circulating fan 98 is supplied to the second cooler 97, the air passing through the second cooler 97 is cooled by the heat-exchange with the second cooler 97 and is then supplied into the freezer compartment 92 to cool the freezer compartment 92 to a predetermined freezer temperature.

The coolant within the second cooler 97 is, after having been gasified, returned to the compressor 106 through the suction tube 109. If, however, the refrigerator temperature detecting means 104 monitoring the temperature inside the refrigerator chamber 83 detects the temperature higher than a refrigerator chamber preset temperature, the valving device 112 is brought into the open position and the first circulating fan 96 is also driven.

As a result, the coolant will rarely flow into the by-pass circuit 110 in which the second capillary tube 111 poses a relatively high resistance to the flow thereof, but flows in most proportions into the coolant circuit where the coolant passing through the valving device 112 is decompressed by the first capillary tube 108 and then flows into the second cooler 97 through the first cooler 95. Accordingly, since the forced draft of air induced by the first circulating fan 96 is supplied through the first cooler 95, the air flowing through the first cooler 95 is cooled by the heat-exchange with the first cooler 95 and the refrigerator chamber 47 is consequently cooled.

In the event that the refrigerator temperature detecting means 104 detects a temperature lower than the refrigerator chamber preset temperature, the valving device 112 is brought to the closed position and the first circulating fan 56 is brought to a halt. On the other hand, if the freezer temperature detecting means 105 detects a temperature lower than the freezer compartment preset temperature, the compressor 106 is brought to a halt and about the same time the second circulating fan 98 is also brought to a halt.

As hereinabove described, since the low-temperature chamber 86 is cooled by the first cooler 95 having an evaporation temperature relatively close to the temperature to which the stored food materials are cooled, any possible variation in temperature and dehydration can advantageously be suppressed. For this reason, storage of raw food materials such as meats and fishes which are qualitatively sensitive to storage environments can be well managed. In addition, a diversity of temperature zones including those inside the refrigerator chamber 83 and the crisper chamber 84 can be obtained with a simplified air passage.

As a result of investigation to determine how refrigerators are used in households, it has been found that the refrigerators are most utilized in a zone distant above the support surface, i.e., the floor within the range of 600 to 1,000 mm. Accordingly, in the practice of the fourth embodiment of the present invention, the first cooler 95 is installed at a level spaced a predetermined height HI within the range of 900 to 1,500 mm as measured from the support surface to a bottom end 95a of the first cooler 95, whereas the second cooler 97 is installed at a level spaced a predetermined height H2 within the range of 400 to 700 mm as measured from the support surface to a top end 97a of the second cooler 97. Accordingly, most of the cooling component parts are not installed at a level spaced 600 to 1,000 mm above the support surface which level falls within the zone of high utilization and, therefore, the capacity can be increased in that zone to provide the refrigerator easy to handle.

In addition, assuming that the first cooler 95 is of a size having a height a, a width b and a depth c and the second cooler 97 is of a size having a height A, a width B and a depth C, the both are designed to satisfy the following relationship:

A<a, B<band C>c

Accordingly, the first cooler 95 is so designed as to have the smaller depth c than that of the second cooler 97, permitting the refrigerator chamber 83 to have an effective capacity at least 10% increased as compared with that in the conventional refrigerator and also a highly utilized crisper chamber 84 to have an effective capacity at least 5% increased as compared with that in the conventional refrigerator. On the other hand, since the second cooler 97 can be installed at a relatively low with the adiabatic partition wall 80 positioned at a level about 600 mm above the support surface, utilization of the zone of high utilization can be increased.

In addition, with respect to the crisper chamber 84 and the low-temperature chamber 86 both located in the zone of high utilization, the crisper chamber 84 below the low-temperature chamber has an increased height to secure the capacity whereas the low-temperature chamber 86 above the crisper chamber 84, which may have a relatively small capacity, has a reduced height. By so designing, those chambers 84 and 86 are well balanced relative to the overall configuration of the refrigerator to permit the refrigerator to store perishables in a favorable manner.

Also, since the first cooler 95 is installed rearward of the low-temperature chamber 96, a low temperature zone can easily be obtained not only by the effect of the forced draft of cooled air produced by the first circulating fan 96, but also by a thermal conduction from the first cooler 96 installed rearward of the low-temperature chamber 96. The low-temperature chamber 96 suffices to have a relatively small required capacity and, therefore, a space can be secured for installation of the first cooler 95 rearward of the low-temperature chamber 96.

The use of the heat insulating panels 88 and 89 disposed above and below the low-temperature chamber 86 is effective to minimize influence which would be brought about by heat on the refrigerator chamber 83 and the crisper chamber 84, and temperature management of the crisper chamber 84 and the low-temperature chamber 86 for accommodating the perishables which tend to be adversely affected by heat can be accomplished in a stabilized fashion. In addition, the low-temperature chamber 86 can be cooled to a lower temperature suitable for partial freezing at about −3° C., thereby providing a freedom of storage of food materials.

Considering that the refrigerator is getting jumboized with the front door assembly consequently increased in size, the use of the casement doors 90 and 91 such as in the fourth embodiment of the present invention is more convenient than the use of the single hingedly supported door, in that opening of either one of the casement doors 90 and 91 is sufficient to remove food material from the refrigerator with a possible escapement of the cooled air minimized. Also, since the crisper chamber 84 and the low-temperature chamber 86 are arranged inside the refrigerator chamber 83, the refrigerator can have an appealing design feature without allowing the user to feel frowned by the weight and bulkiness of the refrigerator.

Furthermore, according to the refrigerating cycle employed in this embodiment of the present invention, the coolant does not flow through the first cooler 95 when the refrigerator chamber 83 do not require cooling and, therefore, the refrigerator chamber 83, the crisper chamber 84 and the low-temperature chamber 86 can be properly controlled in temperature without being excessively cooled. Also, since the valving device 112 is disposed on a high pressure side of the refrigerating cycle, respective amounts of pressure reduced by the first capillary tube 108 and the second capillary tube 111 can be adjusted to suit to the corresponding evaporation temperatures of the first cooler 95 and the second cooler 97, thereby accomplishing an increased freedom of design choice. Also, the valving device 112 can be installed at a location within the engine room 113 and outside the refrigerating area of the refrigerator housing and can easily be assembled, providing a good servicing.

Figure 7:
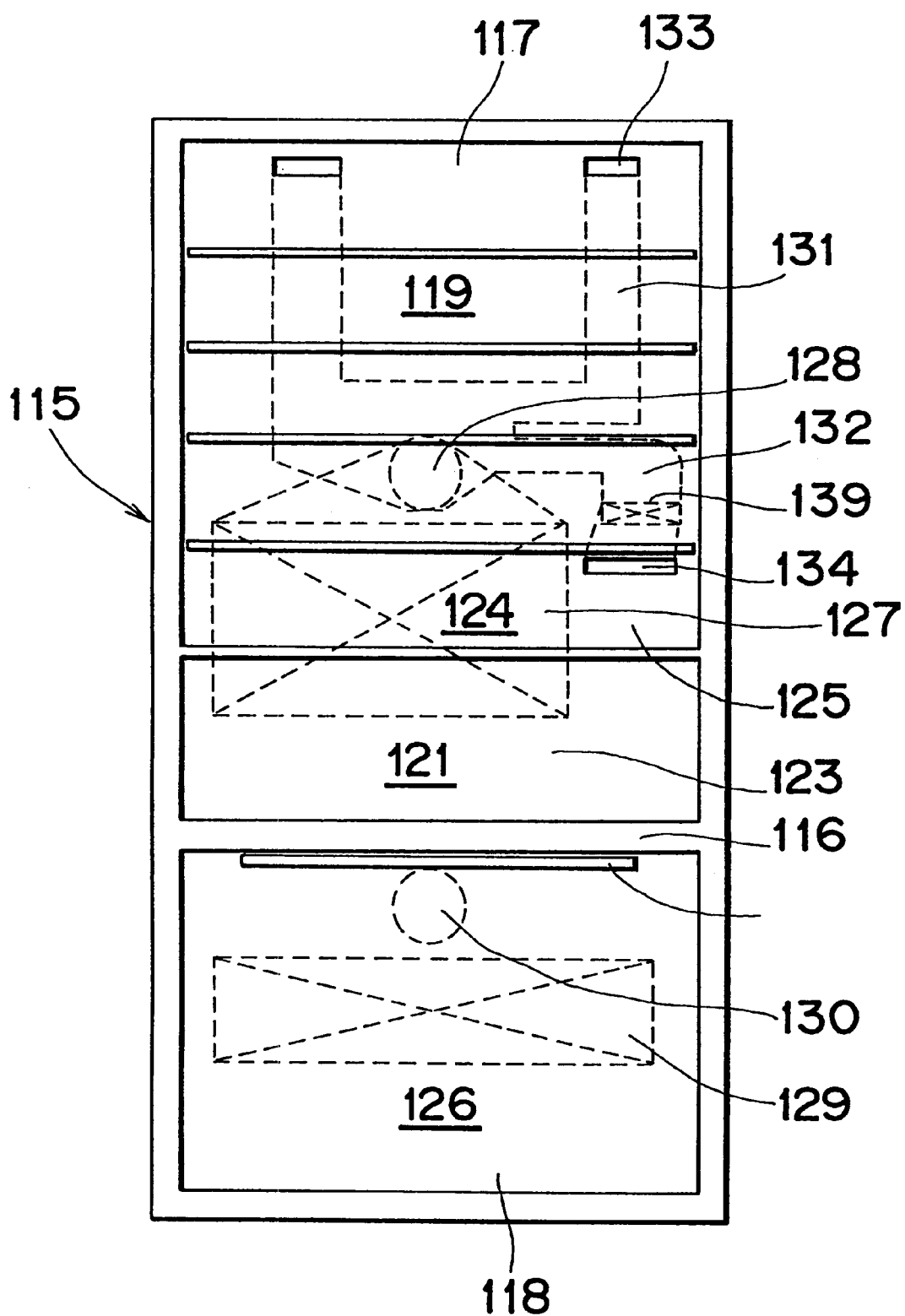
FIG. 7 is a schematic front elevational view of the bottom-freezer refrigerator according to a fifth preferred embodiment of the present invention.
Figure 8:
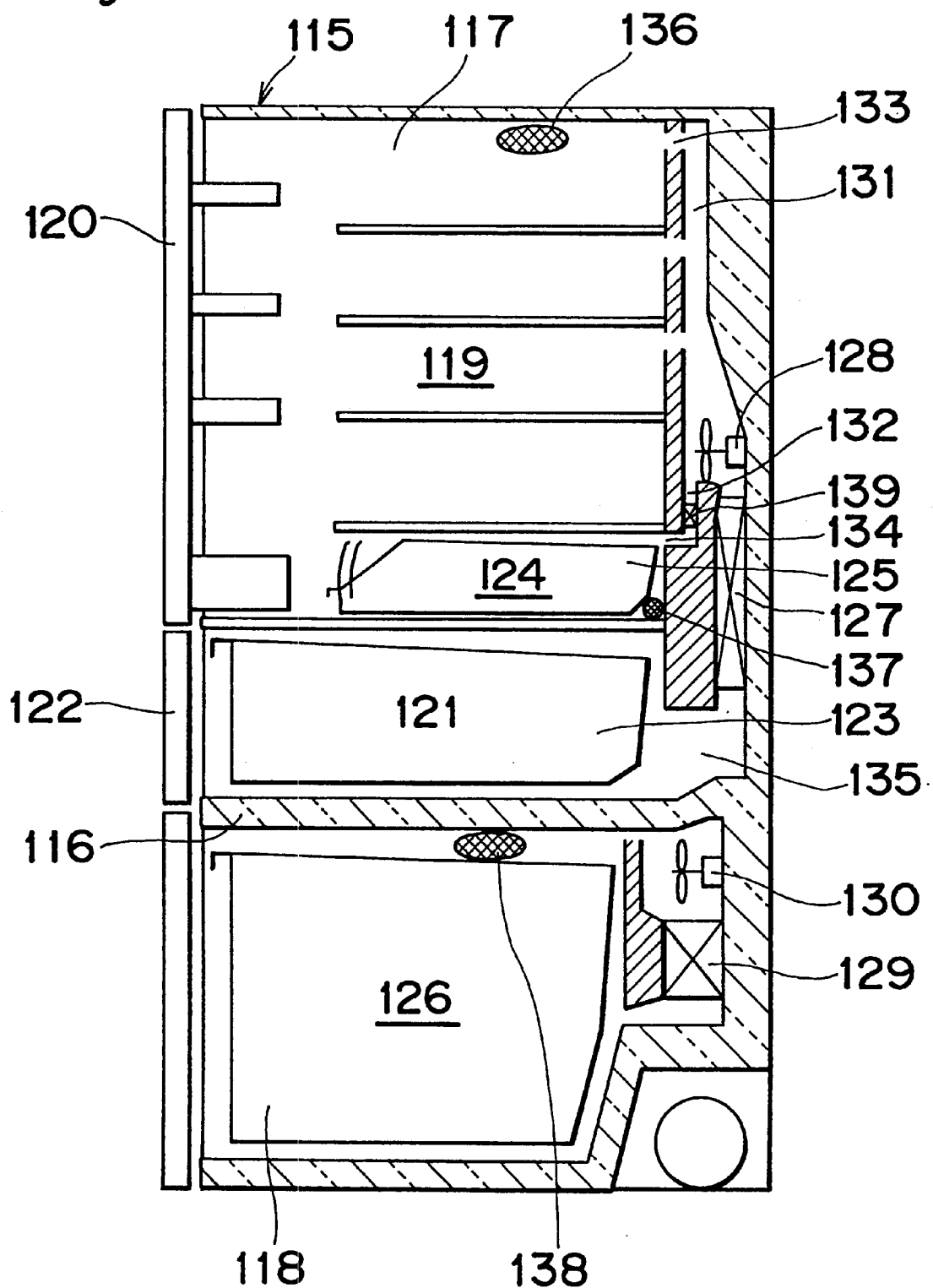
FIG. 8 is a schematic longitudinal side sectional view of the refrigerator shown in FIG. 7.
Figure 9:
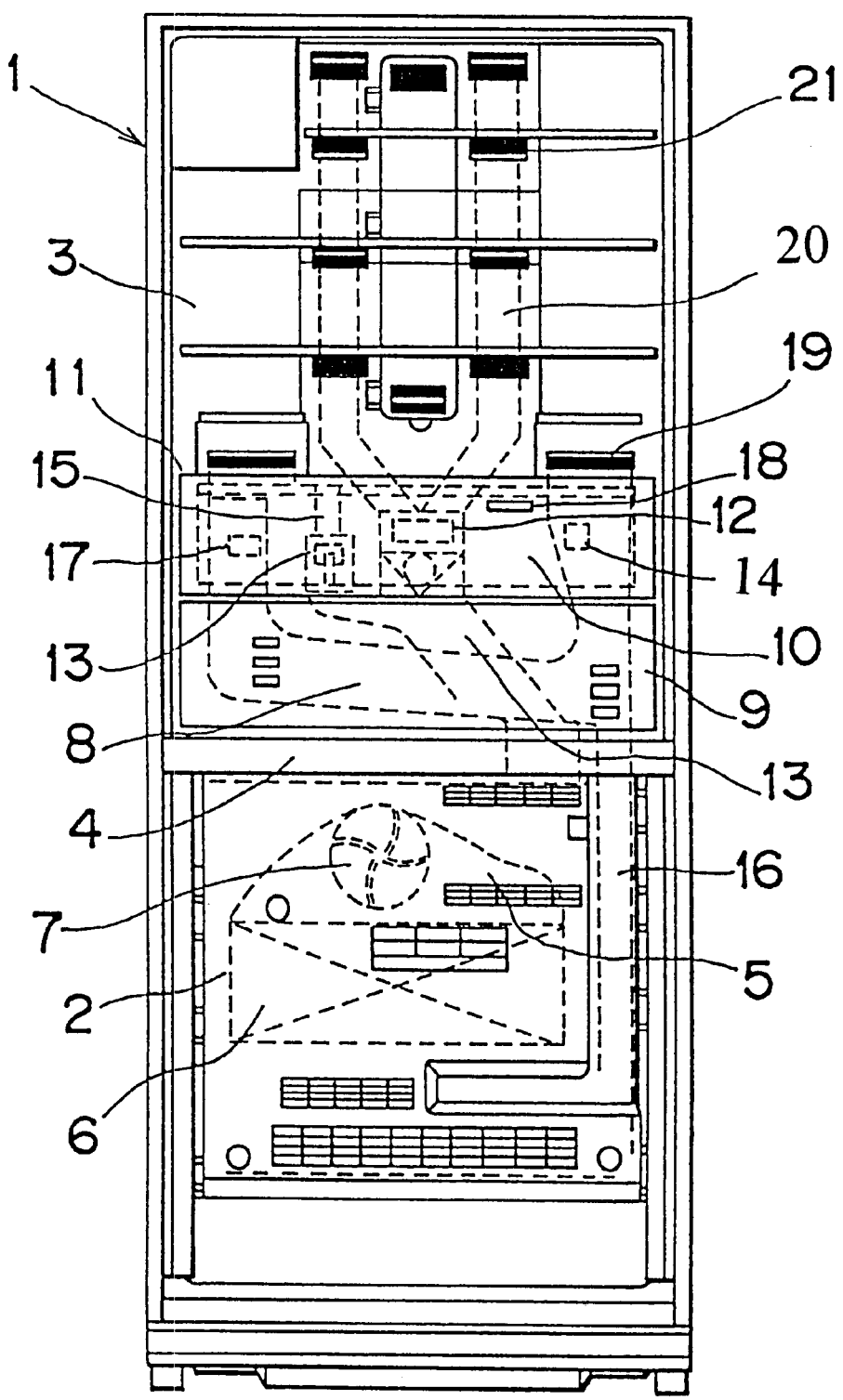
FIG. 9 is a schematic front elevational view of the prior art bottom-freezer refrigerator.
Figure 11:
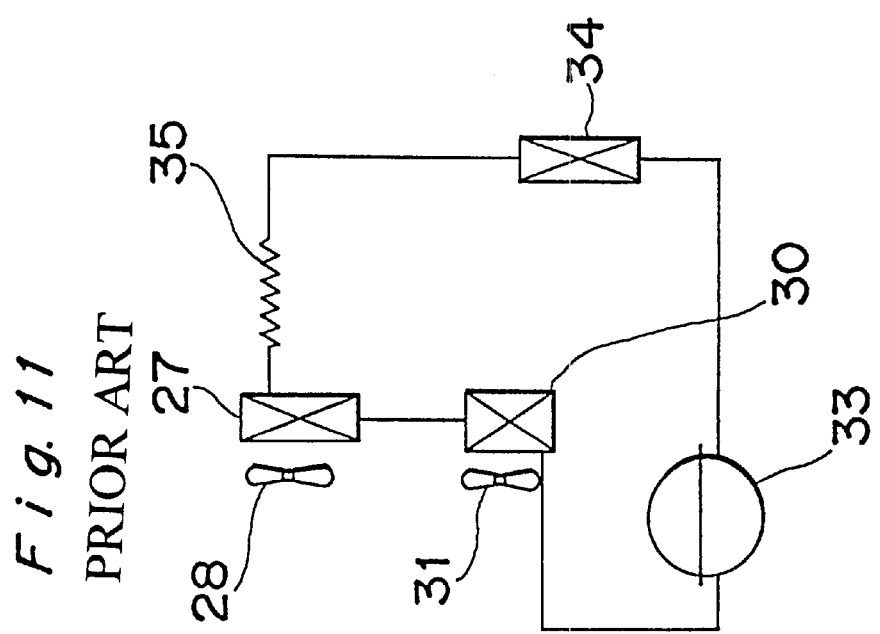
FIG. 11 is a schematic diagram showing the refrigerating fluid circuit employed in the prior art refrigerator shown in FIG. 10.
Figure 10:
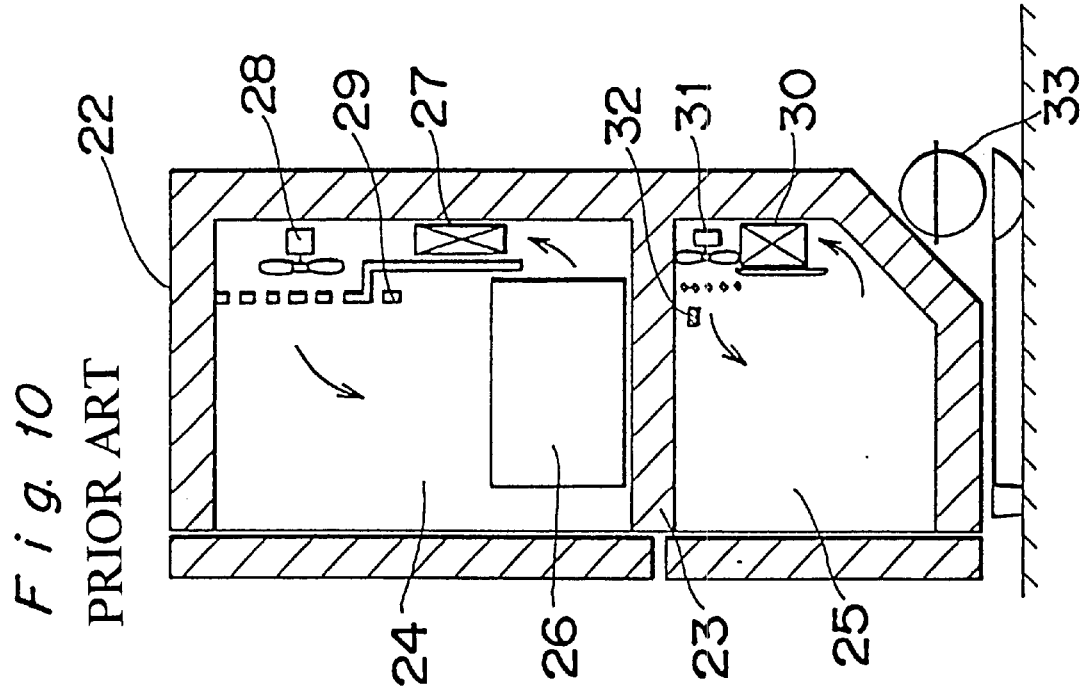
FIG. 10 is a schematic longitudinal side sectional view of another prior art bottom-freezer refrigerator.

(Fifth Embodiment—FIGS. 7 and 8)

The bottom-freezer refrigerator according to a fifth preferred embodiment of the present invention is shown in FIGS. 7 and 8 in front elevational and side sectional representations, respectively.

Referring to FIGS. 7 and 8, the bottom-freezer refrigerator shown therein comprises a generally rectangular box-like housing 115 having its interior divided by an adiabatic partition wall 116 into a top division 117 and a bottom division 118. The adiabatic partition wall 116 is installed at a level about 650 mm spaced above the support surface such as the floor on which the refrigerator stands upright. The top division 117 has a refrigerator chamber 119 provided with a hingedly supported door 120 for selectively opening and closing a front opening leading into the refrigerator chamber 119. The top division 117 also has a crisper chamber 122 defined below the refrigerator chamber 119 and provided with a drawing door 122 at a front opening thereof independent of the refrigerator chamber 119 and including a storage container 123 that can be drawn into or out of the crisper chamber 121 together with the drawing door 122.

Reference numeral 124 represents a low-temperature chamber disposed at a lower region of the refrigerator chamber 119 and above the crisper chamber 121 for storing meats and/or fishes at a temperature lower than that inside the refrigerator chamber 119. The bottom division 118 has a freezer compartment 126 defined therein.

Reference numeral 127 represents a first cooler of a refrigerating system disposed at a location deep rearward of the crisper chamber 121. A first circulating fan 128 is positioned above the first cooler 126 and cooperates with the first cooler 126 for circulating an air cooled by the first cooler 126. Reference numeral 129 represents a second cooler disposed at a location deep rearward of the freezer chamber 125 and cooperable with a second circulating fan 130 positioned above the second cooler 129 for circulating an air cooled by the second cooler 129.

Reference numeral 131 represents a first refrigerator air passage defined rearward of the refrigerator chamber 119 and through which the air cooled by the first cooler 127 can be circulated by the first circulating fan 128 into the refrigerator chamber 119, and reference numeral 132 represents a low-temperature air passage through which the air from the first circulating fan 128 can be supplied into the low-temperature chamber 124. Reference numeral 133 represents a plurality of vent holes defined at desired positions in communication with the first refrigerator air passage 131 for introducing the cooled air into the refrigerator chamber 119, and reference numeral 134 represents a discharge port defined at an outlet of the low-temperature chamber air passage 132 for introducing the cooled air into the low-temperature chamber 124. The cooled air having been circulated within the refrigerator chamber 119 is returned through a return port 135 back to the first cooler 127. The temperature inside the refrigerator chamber 119 is detected by a refrigerator temperature detecting means 136 such as, for example, a thermistor installed within the refrigerator chamber 119: the temperature inside the low-temperature chamber 124 is detected by a low-temperature detecting means 137 such as, for example, a thermistor installed within the low-temperature chamber 124; and the temperature inside the freezer compartment 126 is detected by a freezer temperature detecting means 138 such as, for example, a thermistor installed within the freezer compartment 126.

Reference numeral 139 represents a cooled air supply regulator 139 (hereinafter referred to as a thermo-damper) disposed on the way of the low-temperature air passage 132.

The refrigerator air passage 131 is so designed as to have a cross-sectional surface area sufficient to provide a higher resistance than that in the low-temperature air passage 132.

The manner in which the low-temperature chamber 124 is cooled will now be described. Should the refrigerator temperature detecting means 136 detect a temperature higher than a predetermined temperature, the first circulating fan 128 is brought into operation. If at this time the low-temperature detecting means 137 detects a temperature higher than a predetermined temperature, a flap of the thermo-damper 139 is held in an open position and, accordingly, the air cooled by the first cooler 127 is supplied into the refrigerator chamber 119 and the low-temperature chamber 124. Since the low-temperature air passage 132 has a low resistance in the air passage, a greater amount of the cooled air flows into the low-temperature air passage 132 than in the refrigerator air passage 131 and, as a result thereof, the low-temperature chamber 124 is cooled quicker than the refrigerator chamber 119.

Thereafter, when the low-temperature detecting means 137 detects the temperature lower than the predetermined temperature, the flap of the thermo-damper 139 is brought in a closed position. Since at this time the amount of the cooled air supplied to the refrigerator chamber 119 is small, it has not yet been cooled sufficiently. During the closure of the flap of the thermo-damper 139, the air cooled by the first cooler 127 flows only through the refrigerator air passage 131 and is then supplied into only the refrigerator chamber 119. With passage of time, the refrigerator temperature detecting means 136 detects the temperature lower than the predetermined temperature to bring the first circulating fan 128 to a halt. In this way, the refrigerator chamber 119 and the low-temperature chamber 124 are controlled to the respective predetermined temperatures.

If the ambient temperature around the refrigerator is low, the extent to which the low-temperature chamber 124 is required to be cooled will become higher than that to which the refrigerator chamber 119 is required to be cooled, but even in this case, since the amount of cooling of the low-temperature chamber 124 is set to a value greater than the amount of cooling of the refrigerator chamber 119 due to the air passage resistance, the low-temperature chamber 124 is quickly cooled without the refrigerator chamber 119 consequently not cooled to a temperature at which food material within the refrigerator chamber 119 would be frozen.

On the other hand, even when the amount of cooling of the refrigerator chamber 119 is increased considerably to a value greater than that of the low-temperature chamber 124 as a result of selective opening and closing of the front door, only the refrigerator chamber 119 can be cooled with the flap of the thermo-damper 139 held in the closed position and, therefore, there is no possibility that the low-temperature chamber 124 may be cooled excessively.

Accordingly, the temperature inside the low-temperature chamber 124 can be controlled to a predetermined temperature range notwithstanding change in balance between the respective amounts of cooling of the chambers 119 and 124 which would result from the influence brought about by the ambient temperature and/or the selective opening and closing of the front door, thereby making it possible to provide the refrigerator having the low-temperature chamber 124 having a high capability of preserving the perishables.

On the other hand, since in the fifth embodiment of the present invention shown in FIGS. 7 and 8, the crisper chamber 121 includes the drawing door 122 independent of that for the refrigerator chamber 119, the user can place or remove food materials into or from the crisper chamber 121 with no need to open the front door 120 for the refrigerator chamber 119. Also, since the crisper chamber 121 which is very often used to accommodate relatively bulky food materials can be used by drawing the storage container 123 at a position generally level with the user's waist above the support surface, the refrigerator according to the fifth embodiment of the present invention is advantageously convenient to use.

It is to be noted that the first cooler 129 that is used to cool the refrigerator chamber 119, the crisper chamber 121 and the low-temperature chamber 124 can be installed at a location deep rearward of the crisper chamber 121 to permit the depth of the refrigerator chamber 119 to be effectively utilized, or at a location deep rearward of the refrigerator chamber 119 and the low-temperature chamber 124 to permit the crisper chamber 121 to have an increased depth to permit the chamber 121 to accommodate an increased amount of vegetables and/or fruits.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A bottom-freezer refrigerator comprising:
   a refrigerator housing including an upper portion and a lower portion which are separated by an adiabatic partition wall, said lower portion having a freezer compartment defined therein, and said upper portion having a refrigerator chamber and a crisper chamber defined therein;
   a first cooler in said upper portion at a location spaced from a rear wall of said crisper chamber;
   a first circulating fan in the vicinity of said first cooler;
   a second cooler in said lower portion;
   a second circulating fan in the vicinity of said second cooler; and
   a valving device for switching flow of a coolant in a coolant circuit, so as to allow the coolant to flow through said first cooler and said second cooler when said valving device is in a first position, and to allow the coolant to flow through said second cooler without flowing through said first cooler when said valving device is in a second position,
   wherein said refrigerator chamber and said crisper chamber each are to be cooled by said first cooler operating in cooperation with said first circulating fan, and said freezer compartment is to be cooled by said second cooler operating in cooperation with said second circulating fan.

2. The bottom-freezer refrigerator according to claim 1, wherein said crisper chamber is divided into upper and lower rooms.

3. The bottom-freezer according to claim 1, further comprising a low-temperature chamber inside said refrigerator chamber, wherein said low-temperature chamber is to be cooled by said first cooler operating in cooperation with said first circulating fan such that said low-temperature chamber attains a temperature lower than that attained by said refrigerator chamber.

4. The bottom-freezer refrigerator according to claim 3, wherein said low-temperature chamber is above said crisper chamber and has a volume that is less than that of said crisper chamber.

5. The bottom-freezer refrigerator according to claim 4, further comprising a first heat insulating panel positioned between said crisper chamber and said low-temperature chamber, and a second heat insulating panel positioned at a top of said low-temperature chamber.

6. The bottom-freezer refrigerator according to claim 3, wherein said first cooler is positioned rearward of said low-temperature chamber.

7. The bottom-freezer refrigerator according to claim 6, further comprising a first heat insulating panel positioned between said crisper chamber and said low-temperature chamber, and a second heat insulating panel positioned at a top of said low-temperature chamber.

8. The bottom-freezer refrigerator according to claim 1, further comprising a drawer in said lower portion.

9. The bottom-freezer refrigerator according to claim 8, further comprising a casement door assembly for closing said upper portion.

10. The bottom-freezer refrigerator according to claim 8, further comprising a door for closing said refrigerator chamber, and a drawing door for closing said crisper chamber.

11. The bottom-freezer refrigerator according to claim 1, wherein a lower end of said first cooler is to be positioned a distance of from 900 mm to 1,500 mm above a support surface when the bottom-freezer refrigerator is placed on the support surface, and an upper end of said second cooler is to be positioned a distance from 400 mm to 700 mm above the support surface when the bottom-freezer refrigerator is placed on the support surface.

12. The bottom-freezer refrigerator according to claim 1, wherein a height of said second cooler is less than a height of said first cooler, and a depth of said second cooler is greater than a depth of said first cooler.

13. The bottom-freezer refrigerator according to claim 1, wherein said first circulating fan comprises a box fan.

14. The bottom-freezer refrigerator according to claim 13, wherein said box fan is inclined to force cooled air in an upwardly slanted direction relative to said refrigerator chamber.

15. The bottom-freezer refrigerator according to claim 1, further comprising a closed refrigerating circuit including a compressor, a condenser, a first de-compressor, said first cooler, said second cooler and a suction tube in fluid communication with one another in their stated order, a by-pass circuit interconnecting a discharge side of said first de-compressor and said second cooler, and said valving device at an entrance to said by-pass circuit.

16. The bottom-freezer refrigerator according to claim 15, further comprising a second de-compressor in said by-pass circuit.

17. The bottom-freezer refrigerator according to claim 15, wherein said valving device comprises a sluice valve such that when said sluice valve is in a closed position the coolant is allowed to flow only through said by-pass circuit.

18. The bottom-freezer refrigerator according to claim 15, wherein said valving device comprises a self-holding valve that is capable of consuming electric power only while said self-holding valve is performing a valving operation.

19. The bottom-freezer refrigerator according to claim 15, wherein said valving device is disposed at an outlet of said condenser.

20. The bottom-freezer refrigerator according to claim 1, further comprising an engine room, wherein said valving device is disposed within said engine room.

21. The bottom-freezer refrigerator according to claim 1, wherein said valving device is disposed at an inlet of said first cooler.

22. The bottom-freezer refrigerator according to claim 1, wherein said valving device comprises a motor-driven self-holding valve.

23. The bottom-freezer refrigerator according to claim 1, further comprising a stepper motor to drive said valving device.

24. The bottom-freezer refrigerator according to claim 1, wherein said valving device is to allow the coolant to flow through said first cooler and then through said second cooler when said valving device is in the first position.

25. A bottom-freezer refrigerator comprising:
   a refrigerator housing including an upper portion and a lower portion which are separated by an adiabatic partition wall, said lower portion having a freezer compartment defined therein, and said upper portion having a refrigerator chamber, a crisper chamber and a low-temperature chamber therein;
   a first cooler in said upper portion;
   a first circulating fan in the vicinity of said first cooler;
   a refrigerator air passage interconnecting a discharge side of said first circulating fan and said refrigerator chamber;

a low-temperature air passage interconnecting the discharge side of said first circulating fan and said low-temperature chamber;

a second cooler in said lower portion;

a second circulating fan in the vicinity of said second cooler; and a valving device for switching flow of a coolant in a coolant circuit, so as to allow the coolant to flow through said first cooler and said second cooler when said valving device is in a first position, and to allow the coolant to flow through said second cooler without flowing through said first cooler when said valving device is in a second position;

wherein said refrigerator chamber, said crisper chamber and said low-temperature chamber each are to be cooled by said first cooler operating in cooperation with said first circulating fan such that said low-temperature chamber attains a temperature lower than that attained by said refrigerator chamber, and said freezer compartment is to be cooled by said second cooler operating in cooperation with said second circulating fan.

26. The bottom-freezer refrigerator according to claim 25, wherein said crisper chamber is positioned beneath said refrigerator chamber and said low-temperature chamber is positioned above said crisper chamber.

27. The bottom-freezer refrigerator according to claim 26, further comprising a cooled air supply regulator within said low-temperature air passage.

28. The bottom-freezer refrigerator according to claim 27, wherein said refrigerator air passage is to exhibit an air flow resistance that is greater than that to be exhibited by said low-temperature air passage.

29. The bottom-freezer refrigerator according to claim 27, wherein said cooled air supply regulator comprises a thermo-damper including a flap.

30. The bottom-freezer refrigerator according to claim 26, wherein a lower end of said first cooler is to be positioned a distance of from 900 mm to 1,500 mm above a support surface when the bottom-freezer refrigerator is placed on the support surface, and an upper end of said second cooler is to be positioned a distance from 400 mm to 700 mm above the support surface when the bottom-freezer refrigerator is placed on the support surface.

31. The bottom-freezer refrigerator according to claim 26, wherein a height of said second cooler is less than a height of said first cooler, and a depth of said second cooler is greater than a depth of said first cooler.

32. The bottom-freezer refrigerator according to claim 26, wherein said first circulating fan comprises a box fan.

33. The bottom-freezer refrigerator according to claim 26, further comprising a closed refrigerating circuit including a compressor, a condenser, a first de-compressor, said first cooler, said second cooler and a suction tube in fluid communication with one another in their stated order, a by-pass circuit interconnecting a discharge side of said first de-compressor and said second cooler, and said valving device at an entrance to said by-pass circuit.

34. The bottom-freezer refrigerator according to claim 33, further comprising a second de-compressor in said by-pass circuit.

35. The bottom-freezer refrigerator according to claim 33, wherein said valving device is disposed at an outlet of said condenser.

36. The bottom-freezer refrigerator according to claim 26, wherein said valving device comprises a sluice valve such that when said sluice valve is in a closed position the coolant is allowed to flow only through said by-pass circuit.

37. The bottom-freezer refrigerator according to claim 26, wherein said valving device comprises a self-holding valve that is capable of consuming electric power only while said self-holding valve is performing a valving operation.

38. The bottom-freezer refrigerator according to claim 26, further comprising an engine room, wherein said valving device is disposed within said engine room.

39. The bottom-freezer refrigerator according to claim 26, wherein said valving device is disposed at an inlet of said first cooler.

40. The bottom-freezer refrigerator according to claim 26, wherein said valving device comprises a motor-driven self-holding valve.

41. The bottom-freezer refrigerator according to claim 26, further comprising a stepper motor to drive said valving device.

42. The bottom-freezer refrigerator according to claim 26, wherein said valving device is to allow the coolant to flow through said first cooler and then through said second cooler when said valving device is in the first position.

* * * * *